United States Patent [19]
Winslow, Jr. et al.

[11] Patent Number: 5,283,046
[45] Date of Patent: Feb. 1, 1994

[54] METHOD FOR RE-USE OF AQUEOUS CO-PRODUCT FROM MANUFACTURE OF SODIUM DITHIONITE

[75] Inventors: Charles E. Winslow, Jr., Norfolk; Joseph L. Bush, Chesapeake; Leonard C. Ellis, Suffolk, all of Va.

[73] Assignee: Hoechst Celanese Corporation, Somerville, N.J.

[21] Appl. No.: 613,935

[22] Filed: Nov. 14, 1990

Related U.S. Application Data

[63] Continuation of Ser. No. 355,506, May 23, 1989, abandoned.

[51] Int. Cl.$^5$ ............................................. C01B 17/66
[52] U.S. Cl. ................................................... 423/515
[58] Field of Search ................................ 423/515, 516; 252/188.21, 188.22, 188.23, 188.26, 188.27

[56] References Cited

U.S. PATENT DOCUMENTS

| | | | |
|---|---|---|---|
| 3,298,796 | 1/1967 | Van-Weele et al. | 23/302 |
| 3,622,216 | 11/1986 | Winslow et al. | 423/515 |
| 3,718,732 | 2/1973 | Winslow, Jr. et al. | 423/515 |
| 3,961,034 | 6/1976 | Bostian et al. | 423/515 |
| 4,283,303 | 8/1981 | Ellis | 252/188.24 |
| 4,693,880 | 9/1987 | Arakawa | 423/515 |

FOREIGN PATENT DOCUMENTS

| | | | |
|---|---|---|---|
| 682248 | 1/1983 | European Pat. Off. | 423/515 |
| 48-66594 | 9/1973 | Japan | 423/515 |
| 55-51704 | 4/1980 | Japan | 423/515 |
| 58-79805 | 5/1983 | Japan | 423/515 |
| 58-91004 | 5/1983 | Japan | 423/515 |
| 58-110407 | 7/1983 | Japan | 423/515 |

Primary Examiner—Gary R. Straub
Attorney, Agent, or Firm—Depaoli & O'Brien

[57] ABSTRACT

Aqueous co-product, produced by distillation of reaction filtrate from a batch reaction for manufacturing sodium dithionite by reacting sodium formate, sodium hydroxide, and sulfur dioxide in aqueous methanol solution, is rapidly evaporated to remove about 80% of its water content, so that only the determined quantity of water remains with its determined contents of alkali metal compounds, and is utilized as an admixed component of a succeeding batch.

3 Claims, 1 Drawing Sheet

METHOD FOR RE-USE OF AQUEOUS CO-PRODUCT FROM MANUFACTURE OF SODIUM DITHIONITE

This application is a continuation of application Ser. No. 07/355,506, filed May 23, 1989, now abandoned.

BACKGROUND OF THE INVENTION

This invention relates to the manufacture of anhydrous alkali dithionites by reacting an alkaline formate, an alkali metal agent, and sulfur dioxide in an alcohol/water solvent. It particularly relates to improving this process by reusing aqueous column bottoms from the solvent recovery distillation to produce additional dithionite.

In the process for the manufacture of alkali metal dithionites from an alkali metal salt of formic acid, an alkali metal hydroxide, carbonate or bicarbonate, and sulfur dioxide, the product precipitates in an alcohol/water solution. Upon completion of the dithionite reaction, the product is separated from the reaction filtrate, also termed the mother liquor, by filtration. The filter cake is washed with alcohol to remove the adhering filtrate, and the product is dried. The alcohol in both the filtrate and the wash alcohol is purified for re-use by distillation. The water phase from the distillation is disposed of as a co-product of the manufacturing process. As such, this material has little or no commercial value. It does contain a mixture of metal salts which include formate, metabisulfite, sulfite, thiosulfate, and sulfate. Formate, metabisulfite, and sulfite are either fed directly to the synthesis as raw materials, or are produced as intermediates in the production of dithionites.

It is well known in the manufacture of dithionites that a portion of the dithionite product decomposes during the course of the reaction to form thiosulfate. Furthermore, this decomposition is autocatalytic with respect to thiosulfate; as the concentration of thiosulfate increases, so does its rate of formation. For this reason, the aqueous co-product containing thiosulfate cannot be re-used in the process.

It is also known that certain organic compounds are capable of reacting with or complexing thiosulfates. For example, U.S. Pat. No. 4,622,216 describes a method in which certain organic compounds are added during the course of producing dithionites to react with thiosulfate and thus minimize the decomposition reaction. These thiosulfate-reactive compounds include epoxy compounds such as ethylene oxide, propylene oxide, butyl and isobutyl oxide, epichlorohydrin, and epibromohydrin as well as halogenated hydrocarbons of the general formula RX or XRX, where R is an alkyl group of carbon number 1 to 8, or an allyl, methallyl, or ethylallyl group, and X is a halogen.

When such thiosulfate-reactive compounds are added to a batch reactor, they destroy thiosulfate ions as they are being formed within the reaction vessel and minimize destruction of the sodium dithionite product. The yield of anhydrous sodium dithionite is thereby increased.

Japanese Patent Publication No. 28,397/75 teaches a process for manufacturing anhydrous sodium dithionite in an alcohol/water solvent from sodium formate, an alkali compound, and sulfur dioxide, followed by filtering the sodium dithionite crystals from the mother liquor. The publication discloses a method for recycling a portion of the reaction filtrate with reduced distillation of the filtrate by treating the filtrate with 1-to-4-fold excess on a molar basis of ethylene oxide, propylene oxide, or a mixture thereof over the amount of sodium thiosulfate contained in the reaction filtrate and by allowing the reaction mixture to stand for several hours at room temperature. The reaction filtrate is combined with the methanol used in washing the separated crystals of sodium dithionite to form a mixture of which a part is distilled to recover the methanol and isolate the additional product, which is discarded, of sodium thiosulfate and ethylene oxide or propylene oxide.

Japanese Patent Disclosure No. 110,407/83 teaches a method for producing dithionites by reacting a formic acid compound, an alkali compound, and sulfur dioxide in a water-organic solvent mixture and by adding an epoxy compound, a halogenated hydrocarbon of the general formula R—X, or a mixture of two or more compounds of these types to the reaction mixture in the final stage of the reaction. Suitable epoxy compounds include ethylene oxide, propylene oxide, butylene oxide, isobutylene oxide, styrene oxide, cyclohexene oxide, epichlorohydrin, and epibromohydrin. In the halogenated hydrocarbon, R is a primary or secondary alkyl group having 1-8 carbons, an allyl group, a 2-methylallyl group, or a 2-ethallyl group, and X is a halogen. The filtrate obtained by isolating the dithionite crystals, the organic solvent used for washing the crystals, or a mixture thereof is recycled and reused in the reaction. Both the filtrate and the washing liquid were demonstrated to be equivalent to distilled methanol as the organic solvent for producing sodium dithionite.

In European Patent Publication No. 68,248 and in U.S. Pat. No. 4,388,291, a process is disclosed for producing anhydrous dithionite in which the washing liquid discharged from the washing step is sequentially divided into two portions, a first discharge liquid and a second discharge liquid, the former being treated to convert undesirable substances inhibiting the production of dithionites into substances which do not exert an adverse influence on the production of dithionites by adding an organic compound selected from the group consisting of compounds represented by Formulas I and II and cyclohexene oxide. Formula I is as follows:

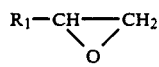

wherein $R_1$ group containing from 1 to 8 carbon atoms, a halogenated alkyl group containing 1 or 2 carbon atoms, a phenyl group, or a substituted phenyl group. The compound represented by this formula includes ethylene oxide, propylene oxide, butylene oxide, epichlorohydrin, epibromohydrin, and styrene oxide. Formula II is as follows:

wherein $R_2$ is a primary or secondary alkyl group containing from 1 to 8 carbon atoms, an allyl group or a 2-methylallyl or 2-ethallyl group, and X is a halogen atom. Suitable compounds include methyl iodide and allyl chloride.

A portion of the treated first discharge liquid was mixed with nearly twice as much of the untreated second discharge liquid and used to prepare sodium dithionite after adjusting for the amount of water in the discharge liquid mixture. The resulting purities and yields for the sodium dithionite product were substantially identical to those obtained with pure methanol.

U.S. Pat. No. 4,693,880 describes a dithionite production process in which the washings first discharged are distilled by a conventional method for recovering the organic solvent, and the subsequent washings are used as the reaction solvent without distillation.

Japanese Patent Publication No. 079,805/83 teaches the addition of an epoxy compound (selected from the group comprising epichlorohydrin, epibromohydrin, butylene oxide, propylene oxide, ethylene oxide, styrene oxide, and cyclohexene oxide) and acid (to bring the pH below 6) to the mother liquor and recycling the treated solution to the next dithionite production stage.

Japanese Patent Publication No. 091,004/83 teaches the addition of propylene oxide or ethylene oxide to the wash liquid and recycling the treated liquid to dithionite production.

Japanese Patent Publication No. 110,406/83 relates to washing the filtered dithionite crystals with an organic solvent containing an epoxy compound or a hydrocarbon halide and recycling the used washing solvent to obtain dithionite of high purity in high yields.

The objective in all of these patents is to recycle a portion of the filtrate, or the wash methanol, or both. The filtrate contains all of the unused raw materials, as much as 25% of the quantity fed to the batch reaction, plus most of the decomposition products. The filtrate also contains all of the water fed to the batch as aqueous solutions of both sodium hydroxide and sodium formate plus the water of reaction produced in the batch as shown in the overall chemical reaction:

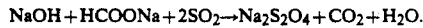

$$NaOH + HCOONa + 2SO_2 \rightarrow Na_2S_2O_4 + CO_2 + H_2O.$$

It also contains all of the alcohol fed to the batch. Since there is a very narrow range of water to alcohol ratio appropriate to the manufacture of sodium dithionite via the formate process, it is patently impossible to recycle all of the filtrate to the next batch. If attempted, no water in which to dissolve the sodium hydroxide and sodium formate would be available, nor would alcohol be available in which to dissolve the sulfur dioxide used as a raw material. Finally, if these obstacles were somehow overcome, the water made via reaction in the recycle batch would create an excessive water to alcohol ratio and severely damage or destroy the product quantity and quality.

In order to recover for re-use all of the unused raw material present in the filtrate, it is necessary to do two things:
A. remove all of the water except that quantity which would normally be present with the raw materials in the filtrate if they were virgin raw materials, and
B. prevent to the greatest extent possible, the formation of sodium thiosulfate both during the batch reaction and during subsequent processing of the filtrate to produce the partially dehydrated material appropriate for re-use to make additional sodium dithionite.

Whether a thiosulfate-reactive compound is added during the dithionite-producing reaction as taught in U.S. Pat. No. 4,622,216, to the reaction filtrate before re-use thereof as taught in Japanese N. 110,407/83, or to the first wash discharge liquid before re-use thereof as taught in Japanese 091,004/83, decomposition of dithionite and formation of thiosulfate continues to occur after the compound has been consumed. If the reaction filtrate is distilled to produce co-product, such thiosulfate formation also continues to occur so that the co-product is not usable as a raw material for the reaction.

Nevertheless, the necessary raw materials to make sodium dithionite are present in the filtrate and in fact some sodium dithionite is produced during distillation. The sodium dithionite that is produced quickly decomposes to form, among other compounds, sodium thiosulfate, because sulfur dioxide that is present as sodium bisulfite in the filtrate is released during distillation. Under typical conditions, the amount of sodium thiosulfate increases about 20–25% during distillation.

It accordingly seemed reasonable that the same compounds could be used to react with thiosulfate present in the largely aqueous co-product, thereby making it possible to re-use the valuable compounds present in the material for manufacture of additional dithionite. However, all of the water that is originally present in the reaction mixture and all of the water formed by chemical reactions during such manufacture is inherently isolated in the co-product. An amount of water must consequently be removed from the co-product which represents the water made during the dithionite reactions plus that associated with the original feed solutions, leaving behind only the water associated with the equivalent amount of raw materials contained in the co-product.

A process for treating the co-product that can enable it to be usable as a raw material for the dithionite-producing reaction is accordingly needed.

SUMMARY OF THE INVENTION

It is therefore an object of this invention to provide a process for re-use of the aqueous co-product produced by distillation of the reaction filtrate.

In accordance with these objects and the principles of this invention, it has been discovered that the aqueous co-product can be evaporated under vacuum until the remaining water is only the water normally associated with the equivalent amount of co-product raw materials that are useful in dithionite-producing reactions.

It has also been discovered that the sulfur dioxide remaining in the co-product can be neutralized prior to the distillation by adding an alkali, preferably sodium hydroxide.

It has further been discovered that the increase in sodium thiosulfate content of the co-product during the evaporation is linearly time dependent.

In addition, the problem of thiosulfate formation during distillation is minimized by adding a sufficient quantity of an alkali metal compound, such as sodium hydroxide, to the reaction filtrate to prevent sodium thiosulfate formation by synthesis and subsequent decomposition of $Na_2S_2O_4$ during distillation. The alkali metal compound converts a portion of the sodium bisulfite in the filtrate to sodium sulfite, preventing the release of free sulfur dioxide during distillation of the filtrate, thereby minimizing or eliminating sodium thiosulfate formation during distillation. This alkali addition is necessary in order to minimize the amount of ethylene oxide or other sodium thiosulfate complexing agent which must be used in the co-product re-use synthesis to produce sodium dithionite, as disclosed in U.S. Pat. No. 4,622,216.

It was noted that the co-product evaporation required between 1 and 2 hours to complete. During the evaporation, the sodium thiosulfate content of the co-product increased by 0.38 pounds/100 pounds co-product, notwithstanding addition of NaOH. This increase was perceived to be linearly time dependent.

Evaporating the water very rapidly using a wiped film evaporator or similar apparatus, involves a retention time of one minute or less and results in an increase of sodium thiosulfate of only 0.01 pounds/100 pounds co-product, compared to the increase of 0.38 pounds/100 pounds co-product when using a retention time of one to two hours.

Consequently, the use of evaporative techniques involving retention times of one minute or less is the most preferred embodiment of this invention. After concentration to remove approximately 80% of the water present, the co-product is then used to make additional sodium dithionite in a separate reactor identical to that in the typical dithionite manufacturing process.

In accordance with the principles of this invention, an aqueous co-product, produced by distillation of a caustic treated reaction filtrate from an earlier batch reaction for making a dithionite by reacting an alkali metal formate, sulfur dioxide, and an alkali metal hydroxide, carbonate, or bicarbonate in aqueous methanol solution, is utilized as feed for a subsequent dithionite batch reaction by means of the following process:

A. determining the contents of alkali metal formate and equivalent alkali metal hydroxide in the co-product;
B. determining the quantity of water normally associated with these alkali metal compounds as used in the batch reactions for making anhydrous alkali metal dithionites;
C. heating the co-product and evaporating water therefrom, (preferably at a retention time of one minute or less) until only the determined quantity of water remains with the determined contents, to produce concentrated co-product;
D. selectively admixing the following materials, at standard feed rates, under standard heating conditions, and at standard pressures, to produce a succeeding batch reaction mixture:
  1. the standard amounts of sulfur dioxide and methanol, minus the determined equivalent amount of sulfur dioxide contained in the concentrated co-product,
  2. the standard amount of the alkali metal formate and of the alkali metal hydroxide, carbonate, or bicarbonate minus the determined amounts of these alkali metal compounds,
  3. the standard amount of water minus the determined associated amount of water,
  4. the concentrated co-product, and
  5. at least one compound selected from the group consisting of ethylene oxide, propylene oxide, butylene oxide, isobutylene oxide, epichlorohydrin, styrene oxide, methyl iodide, allyl chloride, and cyclohexene oxide;
E. heating the mixture to the standard reaction temperature and maintaining this temperature throughout the course of the reaction to produce a completed reaction mixture containing fully reacted alkali metal dithionite;
F. cooling the reaction mixture;
G. filtering the cooled reaction mixture to produce crude alkali metal dithionite and reaction filtrate;
H. separately distilling from the reaction filtrate to produced methanol and a aqueous co-product which may be treated again as previously described or purged as a waste from the system.

BRIEF DESCRIPTION OF THE DRAWING

The FIGURE is a flowsheet of the dithionite manufacturing process, including solvent recovery operations according to the invention.

DESCRIPTION OF THE PREFERRED EMBODIMENTS

Figure 1:
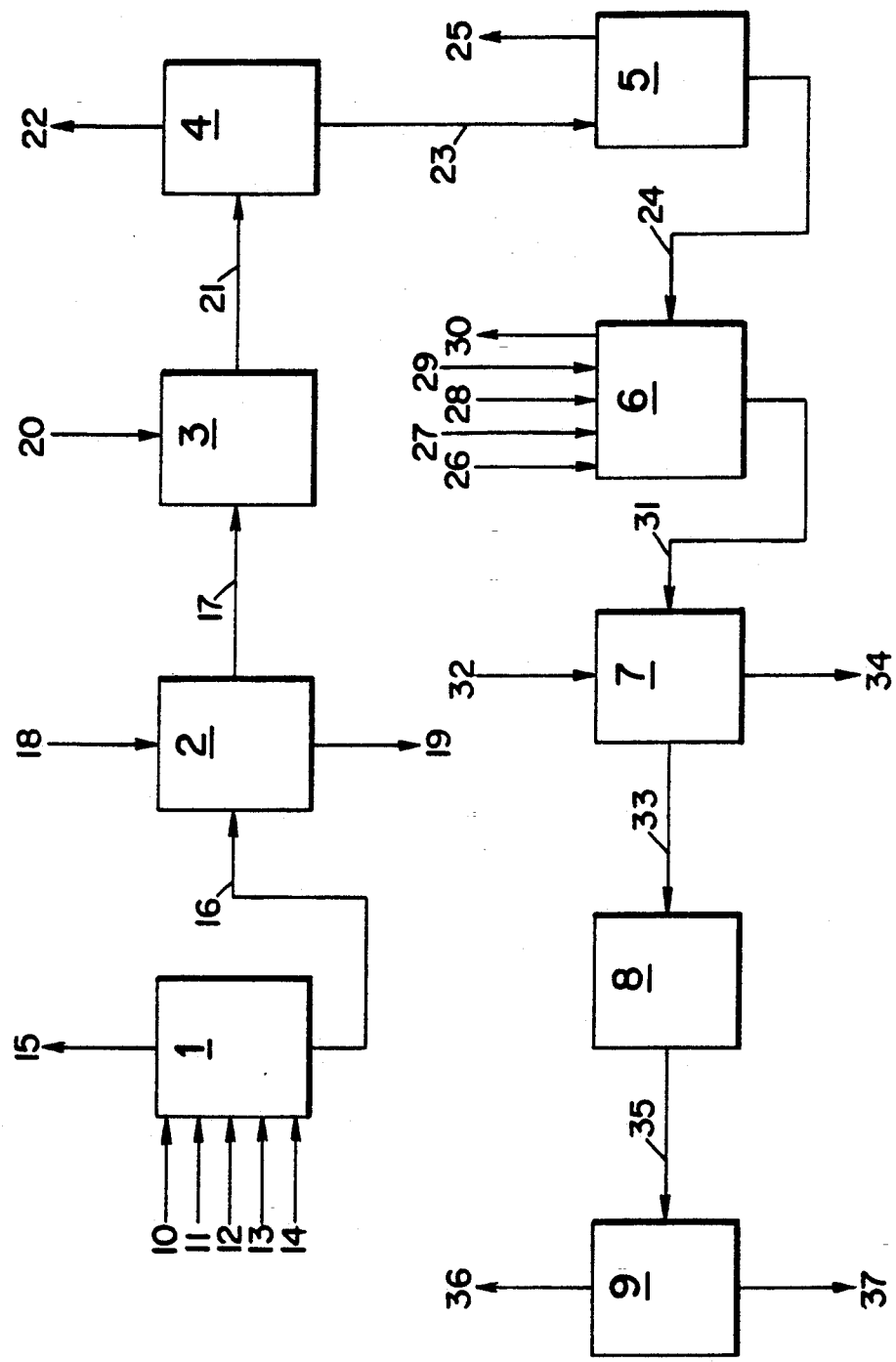

As shown in the FIGURE, the dithionite manufacturing process according to this invention utilizes a pressurized reactor 1 having a reflux condenser, a filter/dryer 2, a filtrate tank 3, a distillation unit 4, and a wiped film evaporator 5, a reuse reactor 6, a re-use filter/dryer 7, a separate filtrate tank 8, and a separate distillation unit 9. Materials that are charged to reactor 1 include an $SO_2$ stream 10, an HCOONa stream 11, a sodium hydroxide stream 12, an ethylene oxide stream 13, and a recycle $CH_3OH$ stream 14. $CO_2$ off-gas stream 15 leaves reactor 1 through a condenser during the reaction. Additional $CH_3OH$ is fed to a scrubber to capture the volatile methyl formate, but it is not shown in the FIGURE. After the reaction has been completed and at the end of a succeeding cooling period, reaction mixture 16 is produced, as a slurry of dithionite crystals in aqueous methanol which is fed to filter/dryer 2. The slurry is filtered in filter/dryer 2 to produce filtrate stream 17 and crude dithionite crystals which are washed with methanol stream 18 and then dried to produce anhydrous $Na_2S_2O_4$ product stream 19. Filtrate stream 17 is fed to filtrate tank 3 with NaOH stream 20, producing treated filtrate. Wash liquid leaves filter/dryer 2 as part of stream 17.

Treated filtrate stream 21 is fed to distillation unit 4, producing recycle $CH_3OH$ stream 22 and aqueous co-product stream 23 which is fed to evaporator 5 to produce concentrated co-product stream 24, for feeding to re-use reactor 6, and water stream 25 which is discarded.

Also fed to re-use reactor 6 are $SO_2$ stream 26, a sodium hydroxide or sodium formate stream 27, an ethylene oxide stream 28, and a recycle methanol stream 29. $CO_2$ off-gas stream 30 leaves reactor 6 through condensers and a scrubber. Additional methanol is fed to the scrubber but is not shown in the FIGURE.

The cooled reaction slurry 31, is fed to filter/dryer 7; the cake is washed with methanol stream 32, producing filtrate stream 33 and, after vacuum drying, product stream 34. Filtrate stream 33 including wash methanol stream 32 is collected in tank 8, from which it is fed as stream 35 to distillation unit 9. The overhead from distillation unit 9 is recycle methanol stream 36, while the aqueous bottoms stream 37 is sent to waste.

EXAMPLE 1

Co-product Generation and Standard Yield (Weight Basis)

To a 100-gallon reactor, 150 pounds of distilled recovered methanol containing 2.89% methyl formate and 1.32% sulfur dioxide were added as a first feed. Next, as a second feed, 5 pounds of 96% sodium formate dissolved in 4 pounds of water were added to the reactor. The reactor contents were heated to 50° C. with agitation. At this temperature, a third feed, consisting of 310 pounds of distilled recovered methanol, of the same composition as the first feed and containing sulfur dioxide of a quantity such that in the first and third feeds there would be a total of 201 pounds of sulfur dioxide, began to be fed to the reactor. The feed rate was controlled so that 80% of its total amount was fed to the reactor in 67.6 minutes. The fourth feed consisted of 127 pounds of 96% sodium formate, 104 pounds of water, and 67 pounds of 99% sodium hydroxide. The fourth feed was started 2.6 minutes after the third feed, and its feed rate was controlled so that it was fed in its entirety in 65 minutes. A fifth feed of 3.3 pounds of pure ethylene oxide was started simultaneously with the fourth feed. Its feed rate was controlled so that it was fed in its entirety in 195 minutes.

Owing to the exothermic nature of the reaction, the mixture self-heated to 84° C. over a 15-minute period. Temperature control was then initiated to maintain 84° C. throughout the course of the reaction. Owing to the evolution of carbon dioxide, the reactor pressure increased to 40 psig during this 15-minute period, and pressure control was then initiated to maintain 40 psig throughout the course of the reaction.

The vented carbon dioxide left the reactor through condensers and a scrubber which was fed at a rate of 0.34 pounds/minute with essentially pure recovered methanol. When the fourth feed terminated, the rate of feed of the third feed was reduced so that the remaining 20% was fed over an additional 65 minutes. At the conclusion of this feed, an additional 65-minute period was allowed for the reaction to go to completion, at which time the ethylene oxide feed ended. The reactor contents were cooled to 73° C. and were discharged to a filtering apparatus wherein the mother liquor was separated from the crude product which was then washed with 190 pounds of essentially pure recovered methanol. The filter cake was vacuum dried to yield the anhydrous product. The yield was 236 pounds of 91.37 weight percent sodium dithionite.

The filtrate was treated with 0.76 pound of sodium hydroxide/100 pounds of filtrate, prior to recovery of the methanol by atmospheric distillation. The amount of sodium thiosulfate produced during the act of distillation was reduced from 0.41 pound of thiosulfate/100 pounds of filtrate without sodium hydroxide addition to 0.0065 pound/100 pounds with sodium hydroxide addition. The co-product from the distillation was collected, analyzed, and shown to contain substances equivalent, on a weight basis, to 1.32% sodium thiosulfate, 7.35% sodium hydroxide, 9.48% sulfur dioxide, 11.13% sodium formate, and 68.20% water. Using aliquots of this co-product, the following small scale experiment was conducted.

EXAMPLE 2

By conventional batch evaporation of 5,068 parts of the co-product from Example 1 under vacuum in the synthesis reactor, 2,880 gm of water were removed over a two hour period. During the course of this evaporation, the sodium thiosulfate concentration increased from 1.32% on a co-product basis to 1.70%, again on a co-product basis. This is a 29% increase during the evaporation. To the concentrated co-product was added 1,773 gm of recovered methanol containing 2.72% methyl formate and 0.31% sulfur dioxide. The mixture was heated, with agitation, to approximately 70° C., at which time 54 gm of propylene oxide was added over a 10-minute period. The mixture was maintained at 70° C. for one hour, at which time 210 gm of 96% sodium formate dissolved in 140 gm water was introduced to the reactor. A first feed mixture was prepared which consisted of 687 gm $SO_2$ and 840 gm recovered methanol of the same composition as that added to the concentrated co-product. A second feed was prepared which consisted of 410 gm of pure recovered methanol and 30 gm of propylene oxide. Propylene oxide was used in these small scale experiments rather than ethylene oxide because of safety and health considerations.

Initially, 17.5% of the first feed was introduced to the reactor immediately. This is the quantity of sulfur dioxide calculated to convert the sodium sulfite in the concentrated co-product to sodium bisulfite. The rate of the first feed was then adjusted to allow 49.2% of the feed to be added at an equal rate over 65 minutes. Simultaneously, the second feed was started and the rate adjusted so that it was fed in its entirety in 195 minutes.

Upon addition of the second portion of the first feed, an exothermic reaction began which caused the contents of the reactor to self-heat. At 83° C., temperature control was initiated to maintain 83° C. throughout the course of the reaction. The reaction evolved $CO_2$, and the reactor pressure was maintained at 30 psig by venting excess $CO_2$ through a condenser. After 65 minutes, the first feed rate was adjusted to allow the remaining 33.3% to feed in 65 minutes. The mixture was then maintained at 83° C. and 30 psig for 65 minutes, at which time the second feed ended. The contents of the reactor were cooled to 73° C. and then filtered. The solid was washed with 1,400 gm of pure recovered methanol, and the filter cake was vacuum dried. The yield was 1,135 gm of 78.04 weight percent sodium dithionite.

EXAMPLE 3

In order to make a pilot plant scale co-product re-use run, it was necessary to make three additional co-product generation batches similar to Example 1. The combined co-product from these runs, 635 lb, was analyzed and shown to contain substances equivalent, on a weight basis, to 2.25% sodium thiosulfate, 5.41% sodium hydroxide, 6.51% sulfur dioxide, 14.52% sodium formate, and 69.50 water.

Using a Kontro Co., Inc., one square foot, horizontal, tapered, agitated film evaporator, 626 lb of the combined co-product was evaporated under vacuum to remove 341 lb of water. During the course of this evaporation, the sodium thiosulfate concentration increased from 2.28% on a co-product basis to 2.29%, again on a co-product basis. This is only a 0.4% increase as compared to the 29% increase using conventional evaporation as in Example 2.

The 244 lb of concentrated co-product was placed in the reactor and to it was added 221 lb of recovered methanol containing 1.8% methyl formate and 0.32% sulfur dioxide. The mixture was agitated, and to it was added 6 lb of ethylene oxide. A first feed mixture was prepared consisting of 94 lb of sulfur dioxide dissolved in 239 lb of recovered methanol of the same composition as that added to the concentrated co-product in the reactor. A second feed was prepared consisting of 9 lb of 99% sodium hydroxide dissolved in 41 lb of water. This additional water gave the proper water to alcohol ratio for optimum results. A third feed consisted of 3.3 lb of ethylene oxide.

Initially, 13.2% of the first feed was added to the reactor. This is the quantity of sulfur dioxide calculated to convert the sodium sulfite in the concentrated co-product to sodium bisulfite. The rate of the first feed was then adjusted so that 67.6% of the total feed would be added uniformly over 65 minutes. Simultaneously, the second and third feeds were started, adjusted so that the second was fed in its entirety in 50 minutes, and the third in its entirety in 195 minutes.

During addition of the second portion of the first feed, an exothermic reaction occurred which caused the reactor contents to self heat. At 84° C. temperature control was initiated to maintain 84° C. throughout the remaining course of the reaction. The reaction evolved carbon dioxide, and the reactor pressure was maintained at 40 psig by venting carbon dioxide from the reactor through two condensers and a scrubber. After 65 minutes, the feed rate of the first feed was adjusted so that the remaining 19.2% was fed during the next 65 minutes. The mixture was then maintained at 84° C. and 40 psig for an additional 65 minutes. At the conclusion of this third 65 minute period the third feed terminated, and the reactor contents were cooled to 73° C. and filtered. After washing the filter cake with 190 lb of methanol, the cake was vacuum dried to yield 135 lb of 85.20% sodium dithionite. The collected filtrate and wash methanol combined were distilled to recover the methanol. The aqueous still bottoms from this re-use batch were not saved for additional re-use, but went to waste.

In Example 2 the equivalent sodium hydroxide content of the concentrated co-product was adequate to supply the alkali requirement of the re-use run, but added sodium formate was needed. In Example 3 the opposite was true; the sodium formate was adequate for the re-use run, but sodium hydroxide had to be added.

The examples illustrates the flexibility of the novel process of this invention. As has been previously pointed out, it is necessary to balance the reactants contained in the co-product with the supplemental raw materials introduced into the reactor. Therefore, the exact composition of the co-product is not critical since the appropriate amount of raw reactant can be added depending upon the co-product composition as illustrated in the above examples. Optimal re-use of the co-product is very much dependent on accurate analytical determination of the various chemicals dissolved in the co-product.

The economic importance of re-use of the co-product is shown in Table 1 which compares the pounds of purchased raw materials required to make one pound of 100% sodium dithionite via the conventional process (Example 1), and via the re-use process (Example 3).

TABLE 1

| Purchased Raw Material Usage/Pound of 100% Sodium Dithionite | | |
|---|---|---|
| | Standard Example 1 | Re-Use Example 3 |
| Sulfur Dioxide | 0.930 | 0.817 |
| Sodium Hydroxide | 0.287 | 0.078 |
| Sodium Formate | 0.655 | 0 |
| Ethylene Oxide | 0.015 | 0.081 |
| Total | 1.798 | 0.976 |

In Example 2, the co-product evaporation required between 1 and 2 hours to complete. During the evaporation, the sodium thiosulfate content of the co-product increased by 0.38 lb/100 lb co-product. This increase was found to be linearly time dependent, so that the preferred embodiment is to evaporate the water very rapidly, using a wiped film evaporator or similar apparatus which involves a retention time of one minute or less. When using an apparatus of this kind, as in Example 3, the increase in sodium thiosulfate content was only 0.01 lb/100 lb of co-product.

After concentration to remove approximately 80% of the water present, the co-product is then used to make additional sodium dithionite in a separate reactor identical to that used in the typical manufacturing process.

What is claimed is:

1. In a process for the production of sodium dithionite by reacting in a suitable reactor sulfur dioxide, sodium formate, sodium hydroxide or carbonate and a thiosulfate-reactive material in the presence of water and an organic solvent to produce sodium dithionite, separating said dithionite by filtration so as to obtain solid sodium dithionite and a reaction filtrate, distilling said reaction filtrate so as to recover said organic solvent and obtain an aqueous co-product, the improvement which comprises
   A. adding an alkaline compound selected from the group consisting of sodium hydroxide and sodium carbonate to said reaction filtrate prior to distilling the same to obtain said organic solvent and said aqueous co-product;
   B. rapidly evaporating water under vacuum from said aqueous co-product so as to minimize the formation of thiosulfate and obtain a concentrated co-product;
   C. using said concentrated co-product as a feed material for the formation of additional sodium dithionite.

2. The process of claim 1, wherein said evaporating is done at a retention time of one minute or less and about 80% of the water in said aqueous co-product is removed.

3. The process of claim 2 wherein said evaporating is carried out in a wiped film evaporator.

* * * * *

UNITED STATES PATENT AND TRADEMARK OFFICE
CERTIFICATE OF CORRECTION

PATENT NO. : 5,283,046
DATED : February 1, 1994
INVENTOR(S) : Bush et al

It is certified that error appears in the above—identified patent and that said Letters Patent is hereby corrected as shown below:

Col. 2, line 49, after "wherein $R_1$" and before "group", the words -- is hydrogen, an alkyl -- should be inserted.

Col 8, line 40, "2.25%" should be deleted and -- 2.28% -- should be inserted therefor.

Signed and Sealed this

Fourth Day of October, 1994

Attest:

BRUCE LEHMAN

*Attesting Officer*   *Commissioner of Patents and Trademarks*